United States Patent
Rothstein et al.

(10) Patent No.: US 8,848,744 B1
(45) Date of Patent: Sep. 30, 2014

(54) RESYNCHRONIZATION OF PASSIVE MONITORING OF A FLOW BASED ON HOLE DETECTION

(71) Applicant: ExtraHop Networks, Inc., Seattle, WA (US)

(72) Inventors: Jesse Abraham Rothstein, Seattle, WA (US); Arindum Mukerji, Seattle, WA (US); Bhushan Prasad Khanal, Seattle, WA (US)

(73) Assignee: Extrahop Networks, Inc., Seattle, WA (US)

( * ) Notice: Subject to any disclaimer, the term of this patent is extended or adjusted under 35 U.S.C. 154(b) by 0 days.

(21) Appl. No.: 13/831,673

(22) Filed: Mar. 15, 2013

(51) Int. Cl.
*H04L 29/12* (2006.01)
*H04J 3/06* (2006.01)
*H04L 12/26* (2006.01)
*H04L 29/06* (2006.01)

(52) U.S. Cl.
CPC .......... *H04J 3/0635* (2013.01); *H04L 43/0823* (2013.01); *H04L 63/1408* (2013.01); *H04L 43/18* (2013.01); *H04L 43/12* (2013.01)
USPC ...................................................... 370/503

(58) Field of Classification Search
CPC ..... H04L 43/12; H04L 43/18; H04L 43/0823; H04L 63/1408; H04L 12/2602
USPC ...................................................... 370/503
See application file for complete search history.

(56) References Cited

U.S. PATENT DOCUMENTS

| | | | |
|---|---|---|---|
| 6,807,156 B1* | 10/2004 | Veres et al. | 370/252 |
| 7,979,555 B2 | 7/2011 | Rothstein et al. | |
| 8,125,908 B2 | 2/2012 | Rothstein et al. | |
| 8,185,953 B2 | 5/2012 | Rothstein et al. | |
| 2003/0214913 A1* | 11/2003 | Kan et al. | 370/252 |
| 2004/0047325 A1* | 3/2004 | Hameleers et al. | 370/338 |
| 2006/0045017 A1* | 3/2006 | Yamasaki | 370/236 |
| 2008/0069002 A1* | 3/2008 | Savoor et al. | 370/241 |
| 2008/0222717 A1* | 9/2008 | Rothstein et al. | 726/14 |
| 2009/0296593 A1* | 12/2009 | Prescott | 370/252 |
| 2010/0322248 A1* | 12/2010 | Ivanov | 370/394 |
| 2013/0010608 A1* | 1/2013 | Ramachandran et al. | 370/242 |
| 2013/0166730 A1* | 6/2013 | Wilkinson | 709/224 |
| 2014/0040451 A1* | 2/2014 | Agrawal et al. | 709/224 |

\* cited by examiner

*Primary Examiner* — Luat Phung
(74) *Attorney, Agent, or Firm* — John W. Branch; Lowe Graham Jones PLLC

(57) ABSTRACT

Embodiments are directed towards resynchronizing the processing of a monitored flow based on hole detection. A network monitoring device (NMD) may be employed to passively monitor flows of packets for a session between endpoints. The NMD may receive copies of the monitored flow and perform processes on the monitored flow. In some situations, some copies of packets may not be fully processed by the NMD, creating a hole in the processing. If a hole is detected in the monitored flow and the processing of the monitored flow is desynchronized, then the NMD may suspend processing until it is resynchronized or for a remainder of the session. If the processing is desynchronized, then the NMD may resynchronize the processing by resuming the processing of the monitored flow at a downstream position of the monitored flow based on the detected hole.

26 Claims, 13 Drawing Sheets

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port ||||||||||||||| Destination port |||||||||||||||||
| 4 | 32 | Sequence number |||||||||||||||||||||||||||||||
| 8 | 64 | Acknowledgement number (if ACK set) |||||||||||||||||||||||||||||||
| 12 | 96 | Data offset |||| Reserved 0 0 0 ||| N S | C W R | E C E | U R G | A C K | P S H | R S T | S Y N | F I N | Window Size ||||||||||||||||
| 16 | 128 | Checksum ||||||||||||||| Urgent pointer (if URG set) |||||||||||||||||
| 20 | 160 | Options (if data offset > 5. Padded at the end with "0" bytes if necessary.) |||||||||||||||||||||||||||||||
| ... | ... | ... |||||||||||||||||||||||||||||||

RESYNCHRONIZATION OF PASSIVE MONITORING OF A FLOW BASED ON HOLE DETECTION

TECHNICAL FIELD

The present invention relates generally to network monitoring, and more particularly, but not exclusively, to resynchronizing the processing of passively monitored flows based on a detected hole in the monitored flow.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transport Communication Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. Additionally, the HTTP protocol is listed on the seventh layer of the OSI model and on the fourth layer of the TCP/IP model.

To assess and troubleshoot communicated packets and protocols over a network, different types of network monitors can be employed. In some instances, a network monitor may operate as a proxy that is actively arranged between two endpoints, such as a client device and a server device. A network monitor proxy intercepts each packet sent by each endpoint and retransmits or forwards each intercepted packet to the other endpoint. Since network monitor proxies actively monitor network packets, they often enable a variety of additional services such as caching, content filtering, and access control.

Another type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. In other instances, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. In still other instances, packet copies may be provided to the network monitors from a specialized network tap. However, in some situations the network monitor may not receive copies of packets that are transmitted between endpoints, thus creating a hole.

Holes can be a common occurrence with passively monitoring flows of packets, which may, in some situations, result in a monitoring device being put into a desynchronized state. Without the ability to resynchronize, the monitoring device may miss a lot of information transmitted between endpoints. This may be especially true with long-lasting flows. It is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 12 illustrates one embodiment of a use case of a network protocol header.

DETAILED DESCRIPTION

Figure 1:
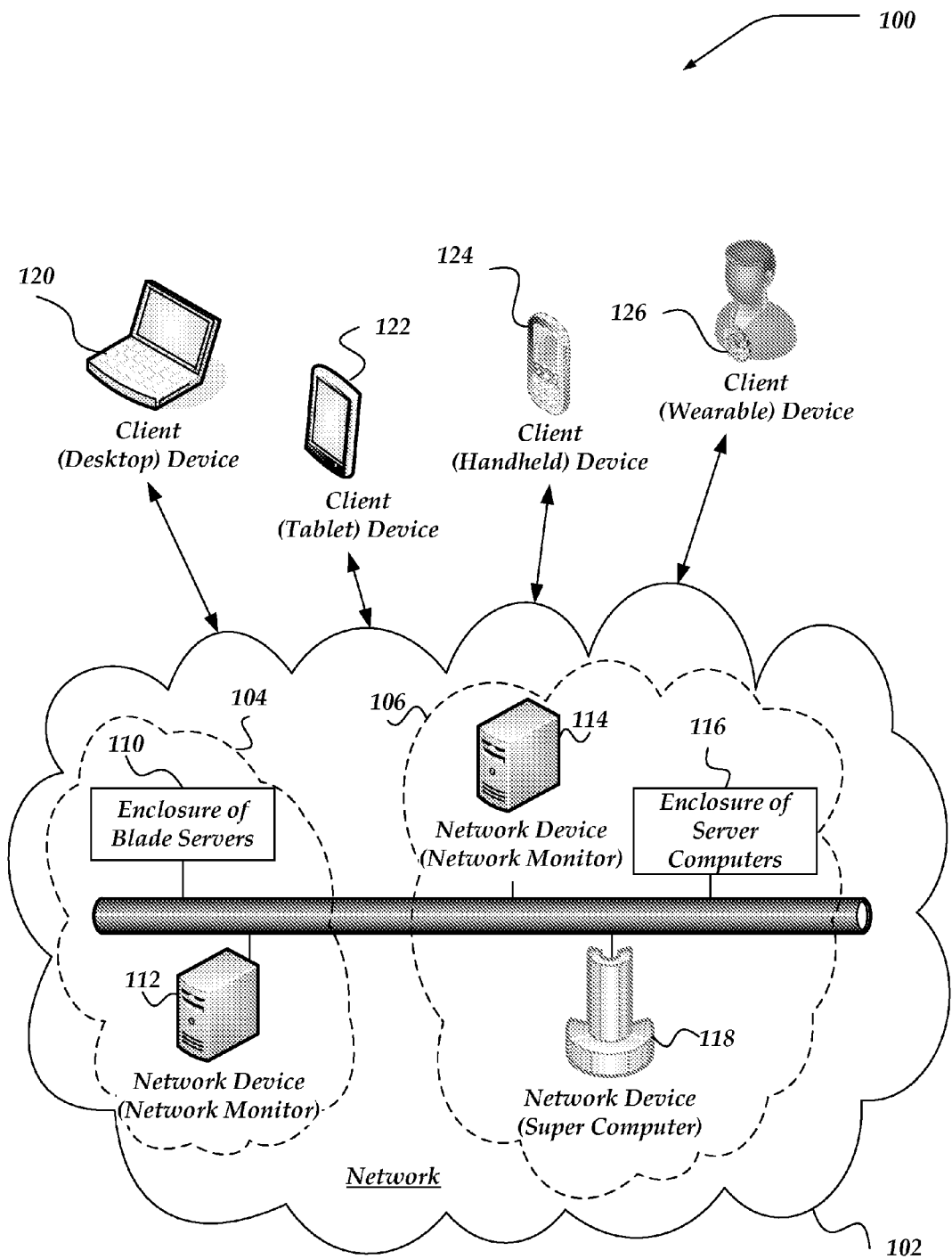
FIG. 1 illustrates a system environment in which various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the term "connection" refers to a communication session with a semi-permanent connection for interactive packet interchange between two or more communicating endpoints, such as network devices. The connection is established before any useful data is transferred, and where a stream of data is delivered in the same order as it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol, such as TCP, can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "flow" refer to one packet or a stream of packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with a handshake and creates a single bi-directional flow between two endpoints, e.g., one direction of the flow going from endpoint A to endpoint B, the other direction of the flow going from endpoint B to endpoint A, where endpoint A and endpoint B are IP-Port source and destinations. In at least one of the various embodiments, a tuple may be employed to identify a flow. Also, other protocols may establish a separate flow for control information that enables management of at least one or more flows between two or more endpoints.

As used herein, the terms "network monitor", "network monitor device", or "NMD" refer to an application (software, hardware, or some combination) that is arranged to monitor and/or record flows of packets in a session that are communicated between at least two endpoints over at least one network. In some embodiments, the packets that are monitored by the NMD may be referred to as "monitored packets" or "monitored data." The NMD can provide information for assessing different aspects of these monitored flows. In at least one embodiment, the NMD passively monitors network packet traffic without participating in the communication protocols. This monitoring is performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMD can receive network communication for monitoring through a variety of means including network taps, wireless receivers, port mirrors or directed tunnels from network switches, servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

The NMD may track network connections from and to endpoints, such as a client and/or a server. The NMD may also extract information from the packets including protocol information at various layers of the communication protocol stack. The NMD may reassemble or reconstruct the stream of data exchanged between the endpoints. The NMD may perform decryption of the payload at various layers of the protocol stack. The NMD may passively monitor the network traffic or it may participate in the protocols as a proxy. In some embodiments, the NMD may set and/or transform to different states based on the data arriving to and from the endpoints. One non-limiting, non-exhaustive example of such an NMD may be an Independent Computing Architecture receiver.

The NMD may attempt to classify the network traffic according to communication protocols that are used. The NMD may categorize the traffic where categories might include file transfers, streaming audio, streaming video, database access, interactive, gaming, and the like. The NMD may attempt to determine whether the traffic corresponds to known communications protocols, such as HTTP, FTP, SMTP, RTP, Tabular Data Stream (TDS), TCP, IP, and the like. In some embodiments, protocol classification may be a necessary precondition to application classification. While some protocols run on well known L4 ports, others do not. Even if there is traffic on a well known port, it is not necessarily the protocol assigned to that port. As a result, protocol classification can include additional analysis, such as signature matching, traffic analysis, and other heuristics. Sometimes protocol classification can be adaptive.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end-to-end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet. Also, application layer protocols may include, wire protocols used by relational databases (e.g., relational database management system (RDBMS)), message queues, caches, and so on. Additionally, some of the application layer protocols may use an open specification and/or open standard while others may have proprietary specifications.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "hole" may refer to one or more packets associated with a flow for a session between at least two endpoints (e.g., network devices) that are successfully communicated between the at least two endpoints, but corresponding copies of the packets are dropped prior to being fully processed by an NMD (e.g., generating information based on the copied packets). In some embodiments, endpoints may include, but are not limited to, client devices, server devices, other network devices, virtual devices, or the like.

In some circumstances, when an NMD attempts to reassemble and/or reconstruct a flow of packets exchanged between two or more endpoints, some packets can be missing. These missing packets may be determined to be a hole. A hole may be created for a number of different reasons. For example, assume an Ethernet switch transmits network packets between endpoint A and endpoint B, and the Ethernet switch provides a copy of the packets to an NMD using a port mirror or SPAN. Sometimes, the Ethernet switch might drop one or more copied packets prior to providing to the NMD due to a variety of reasons (e.g., SPAN oversubscription). In other situations, the NMD may receive the copied packets, but might drop one or more of the copied packets before being fully processed due to resource exhaustion of the NMD or missing a deadline (e.g., not servicing a queue fast enough). These dropped packets may result in a hole. The examples are not to be construed as limiting, and other circumstances, situations, conditions, or the like, may result in a hole.

As used herein, the term "desynchronized" or "desynchronized state" may refer to the processing of monitored packets (e.g., monitored data) by an NMD that fails to match the corresponding flow of packets transmitted between endpoints due to a hole. So, in at least one embodiment, the NMD may be in a desynchronized state if the processing of monitored data is desynchronized. Accordingly, when the NMD is in a desynchronized state, the NMD may be unable to interpret and/or continue processing the data for the flow. In some embodiments, a hole (but not necessarily all holes) may result in the NMD entering a desynchronized state. In some situations, a hole may not result in the NMD entering a desynchronized state, such as, for example, if the NMD is determining how long it takes a file to transfer between endpoints, where the start and end of the transfer are known and a hole occurs in the middle of the transfer.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to resynchronizing the processing of a passively monitored flow based on hole detection. In at least one embodiment, an NMD may passively monitor at least one flow of packets for a session between at least two endpoints. In some embodiments, the NMD may provide passive monitoring, such that network packets of the flow are communicated between the endpoints independent of an action by the NMD. The NMD may receive copies of the flow packets. The NMD may perform one or more processes on the monitored flow, such as, for example, traffic categorization, network health monitoring, or the like. In some situations, some data, or copies of packets, may not be fully processed by the NMD, creating a hole in the processing. In at least one embodiment, the processing of the monitored flow may include generating information based on the copies of packet for the monitored flow. If a hole is detected in the monitored flow, then the NMD may determine if the processing (or generating of information) is desynchronized with the monitored flow (i.e., the NMD may be in a desynchronized state). If the processing is desynchronized, then the NMD may resynchronize the stream of data by resuming the processing of the monitored flow at a downstream position of the monitored flow based on the detected hole. In at least one of various embodiments, if the generating of information is determined to be desynchronized, the generating of information may be resynchronized based at least on resuming generating information at a downstream position that is based on at least one aspect of the hole (e.g., a size of the hole).

In some embodiments, the processing of the monitored flow may be suspended until it is resynchronized. In other embodiments, the processing of the monitored flow may be suspended for a remainder of the session. In at least one of various embodiments, the processing may be resynchronized by continuing the processing of the monitored flow at a determined known sequence of data included in the monitored flow after the hole. In another embodiment, the processing may be resynchronized by continuing the processing of the monitored flow at a determined known sequence of data included in the monitored flow after the hole, where the known sequence of data corresponds to a result of traffic analysis performed on the monitored flow.

In some other embodiments, the monitored flow may be encrypted using a stream cipher, block cipher, or the like. If then monitored flow is encrypted using a stream cipher, then the encrypted monitored flow may be decrypted after a detected hole by advancing a corresponding keystream to account for the hole. If the monitored flow is encrypted using a block cipher, then the encrypted monitored flow may be decrypted after a detected hole by utilizing a next complete block of data in the monitored flow after the hole as initialization vector to resume decryption of the encrypted monitored flow after the hole.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include network devices 112 and 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, network devices 112 and 114 may include module, processes, components, services, or the like, and which are operative to perform as a Network Monitor Device (NMD). These NMDs are arranged to monitor and record flows of packets in a session that are communicated between at least two endpoints over at least one network. These NMDs can provide information for assessing different aspects of these monitored flows. In at least one embodiment, the NMDs passively monitor network packet traffic without participating in the communication protocols. Both network devices 112 and 114 are arranged to operate as NMDs that may perform actions as further described in conjunction with at least the figures beginning at FIG. 6.

Although FIG. 1 illustrates network devices 112 and 114 as single computing devices, the invention is not so limited. For example, one or more functions of network devices 112 and 114 may be distributed across one or more distinct network devices. Moreover, network devices 112 and 114 are not limited to a particular configuration. Thus, in one embodiment, network devices 112 and 114 may contain a plurality of network devices. In another embodiment, network devices 112 and 114 may contain a plurality of network devices that operate using a master/slave approach, where one of the plurality of network devices of network devices 112 and 114 operates to manage and/or otherwise coordinate operations of the other network devices. In other embodiments, network devices 112 and 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Also, in at least one of the various embodiments, enclosure of blade servers 110, enclosure of enclosure of server computers 116, super computer network device 118 may include network devices that perform the actions of cloud code server device 112 and cloud platform server device 114. In at least one embodiment, at least one blade server or at least one server computer may be arranged to also operate as an NMD.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), 5th (5G), 6th (6G), generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, HSDPA, LTE and the like.

Enclosure of Blade Servers

Figure 2A:
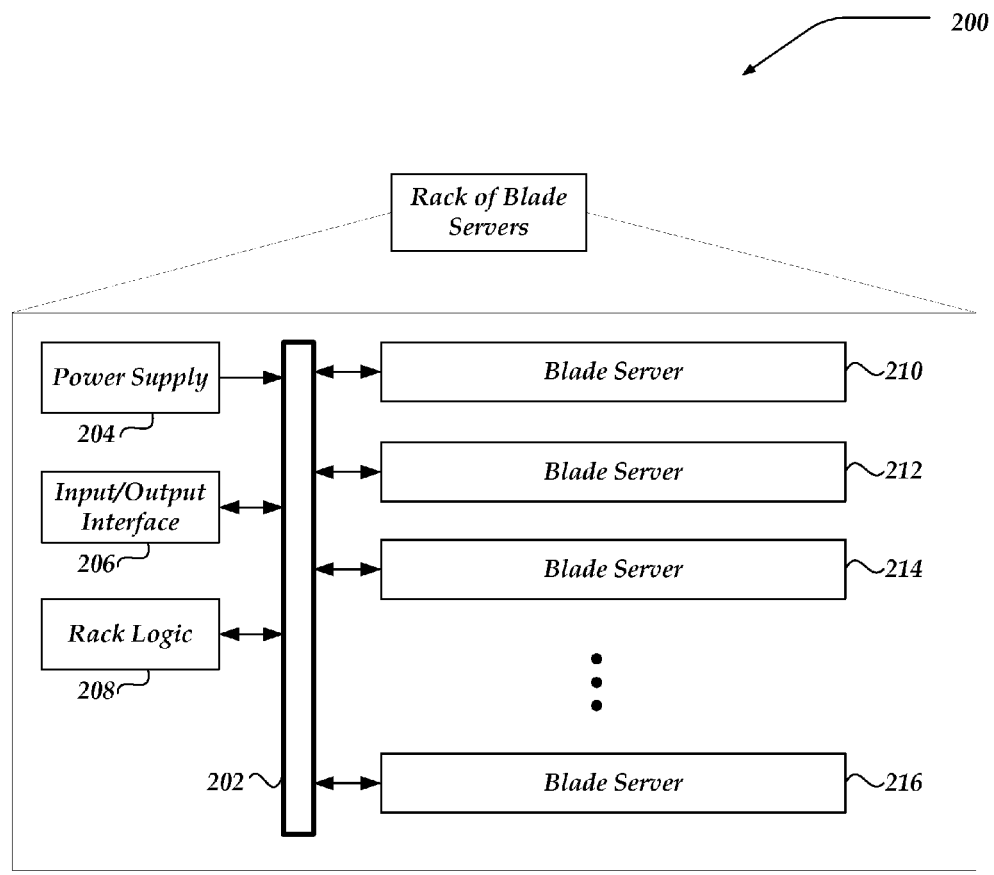
FIG. 2A shows a rack of blade servers that may be included in various embodiments.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
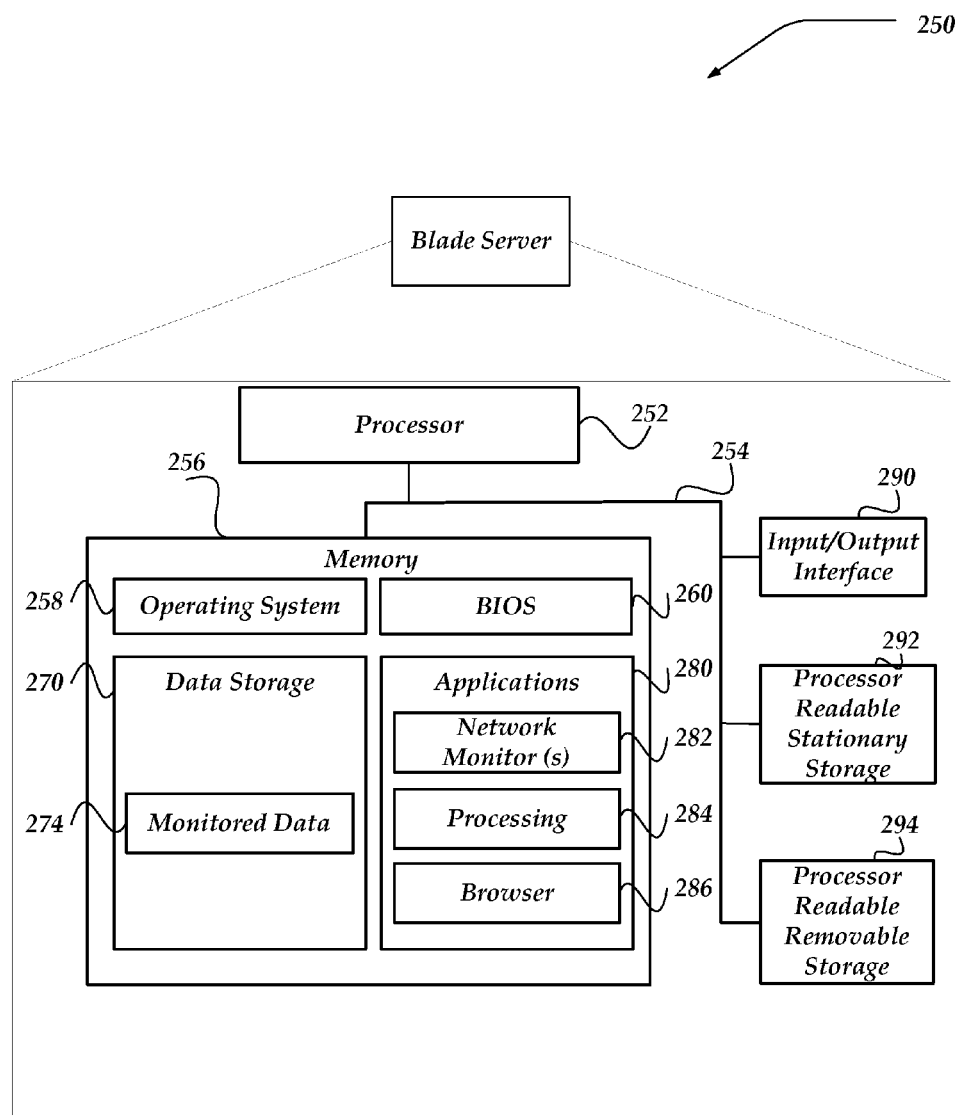
FIG. 2B illustrates an embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, Linux™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions such as those described in conjunction with FIGS. 6-11. In one embodiment, at least some of data storage 270 might also be stored on another component of blade server 250, including, but not limited to, processor-readable removable storage device 294, processor-readable stationary storage device 292, or any other non-transitory processor-readable storage device (not shown). Data storage 270 may include, for example, monitored flows 274, or the like. Monitored data 274 may be arranged to record copies of packets associated with a flow, as well as other supporting data. In some embodiments, monitored data 274 may permanently or temporarily store these copied packets. In at least one embodiment, the copied packets may be deleted and/or moved to other storage once processed.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, Network Monitor(s) 282, processing application 284, and Browser 286, which may be enabled to perform actions further described below starting with at least FIG. 6.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, network monitor application 282, and processing application 284 may be operative in a cloud-based computing environment. In at least one of the various embodiments, these applications, and others, may be executing within virtual machines and/or virtual servers that may be managed in a cloud-based based computing environment. In at least one of the various embodiments, in this context the applications may flow from one physical blade server and/or network device within the cloud-based environment to another depending on performance and scaling considerations automatically managed by the cloud computing environment. Likewise, in at least one of the various embodiments, virtual machines and/or virtual servers dedicated to running network monitor application 282 and processing application 284 may be provisioned and de-commissioned automatically.

Also, in at least one of the various embodiments, monitored data 274, or the like, may be located on virtual servers running in a cloud-based computing environment rather than being tied to one or more specific physical blade servers.

Illustrative Client Device

Figure 3:
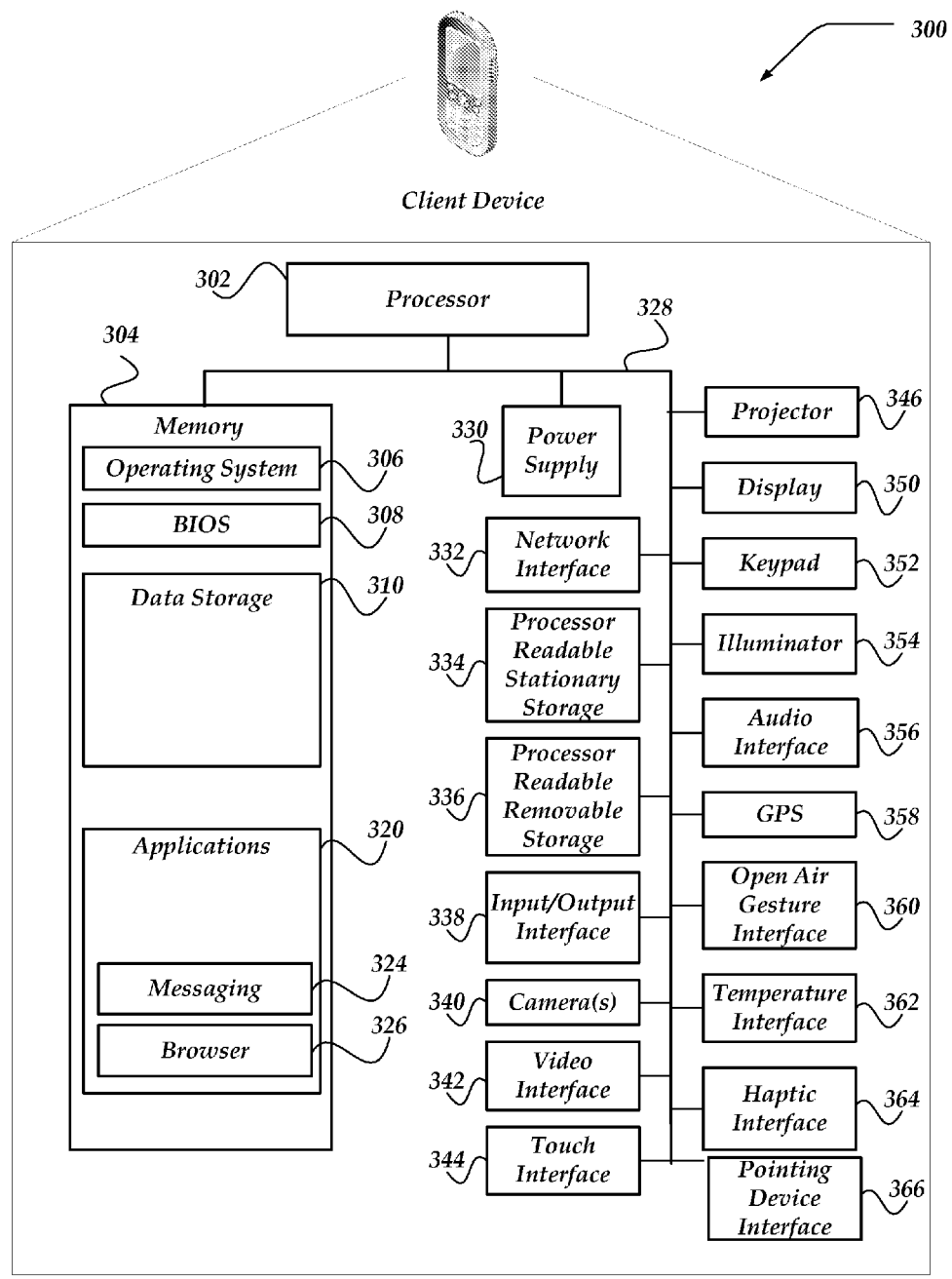
FIG. 3 shows a client device that may be included in various embodiments.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or Linux™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by mobile device 300, transmit, receive, and/or otherwise process instructions and data. Applications 320 may include, for example, processing application 322. In at least one of the various embodiments, messaging application 324, and browser application 326 may be used to communicate with blade servers 110, server computers 116 and/or Supercomputer 118, and/or cloud code device 112, of FIG. 1, including, but not limited to, queries, searches, API calls, content, data, messages, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
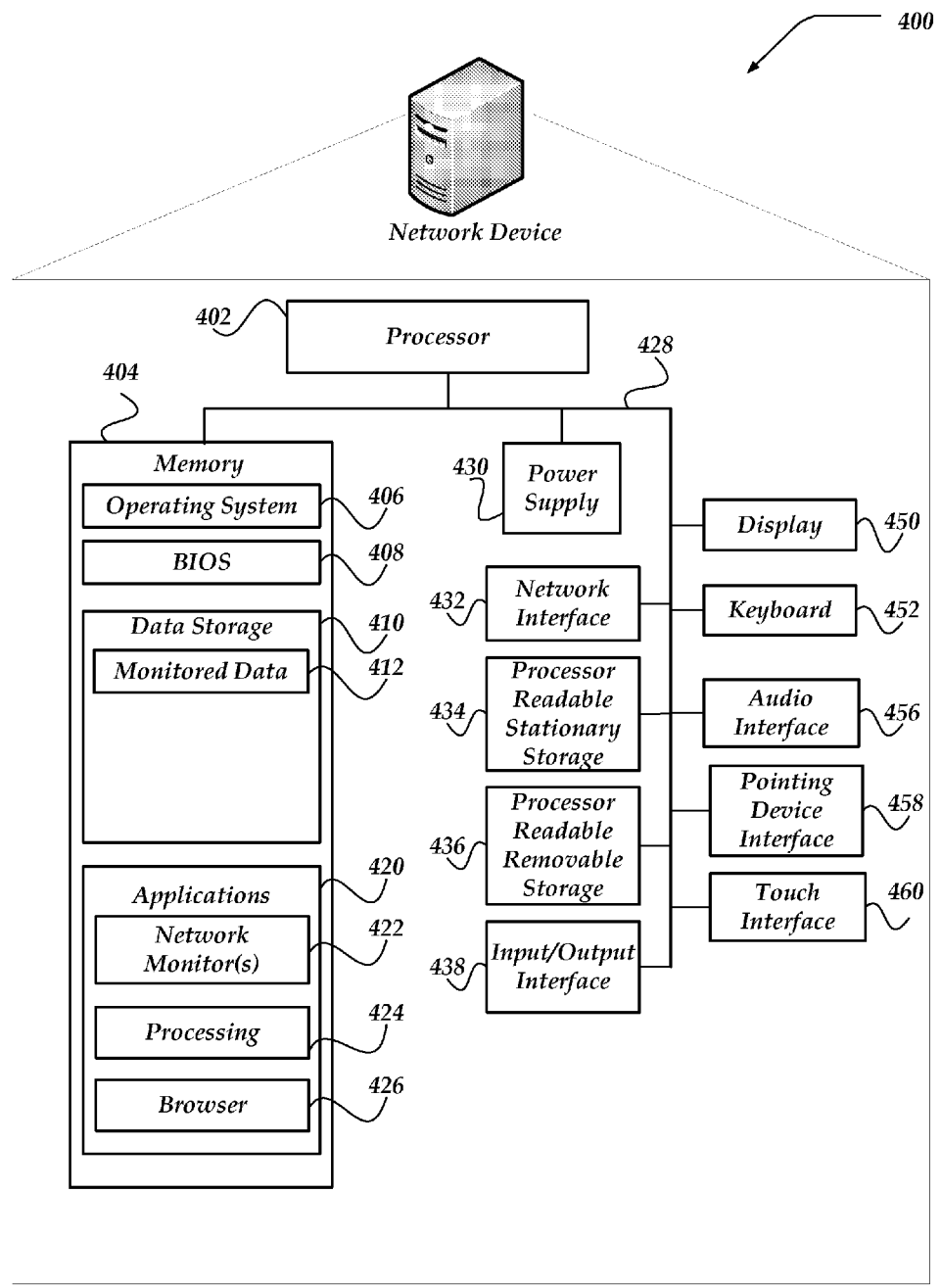
FIG. 4 illustrates a network device that may be included in various embodiments.

FIG. 4 shows one embodiment of network device 400 that may be included in a system implementing the invention. Network device 400 may include many more or less components than those shown in FIG. 4. However, the components shown are sufficient to disclose an illustrative embodiment for practicing these innovations. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), GSM, CDMA, time division multiple access (TDMA), UDP, TCP/IP, SMS, MMS, GPRS, WAP, UWB, WiMax, SIP/RTP, or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include RAM, ROM, and/or other types of memory. Memory 404 illustrates an example of computer-readable storage media (devices) for storage of information such as computer-readable instructions, data structures, program modules or other data. Memory 404 stores BIOS 408 for controlling low-level operation of network device 400. The memory also stores an operating system 406 for controlling the operation of network device 400. It will be appreciated that this component may include a general-purpose operating system such as a version of UNIX, or Linux™, or a specialized operating system such as Microsoft Corporation's Windows® operating system, or the Apple Corporation's iOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those action describe in conjunction with FIGS. 6-11. In one embodiment, at least some of data storage 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, monitored data 412. In at least one embodiment monitored data 412 may be an embodiment of monitored data 274 of FIG. 2B.

Applications 420 may include computer executable instructions which, when executed by network device 400, transmit, receive, and/or otherwise process messages (e.g., SMS, MMS, Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include Network Monitor application 422, processing application 424, and Browser application 426 which may be enabled to perform actions further described below starting with at least FIG. 6. In at least one of the various embodiments, while they may be illustrated here as separate applications, Network Monitor application 422 and/or processing application 424 may be implemented as modules and/or components of the same application. Further, in at least one of the various embodiments, Network Monitor application 422 and/or processing application 424 may be implemented as operating system extensions, modules, plugins, or the like.

Furthermore, in at least one of the various embodiments, Network Monitor application 422 and processing application 424 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network device within the cloud-based environment to another depending on performance and scaling considerations automatically managed by the cloud computing environment. Likewise, in at least one of the various embodiments, virtual machines and/or virtual servers dedicated to running Network Monitor application 422 and/or processing application 424 may be provisioned and de-commissioned automatically.

Also, in at least one of the various embodiments, monitored data 412, or the like, may located in virtual servers running in a cloud-based computing environment rather than being tied to one or more specific physical blade servers or server computer devices.

Illustrative Passive Network Monitor Device

Figure 5:
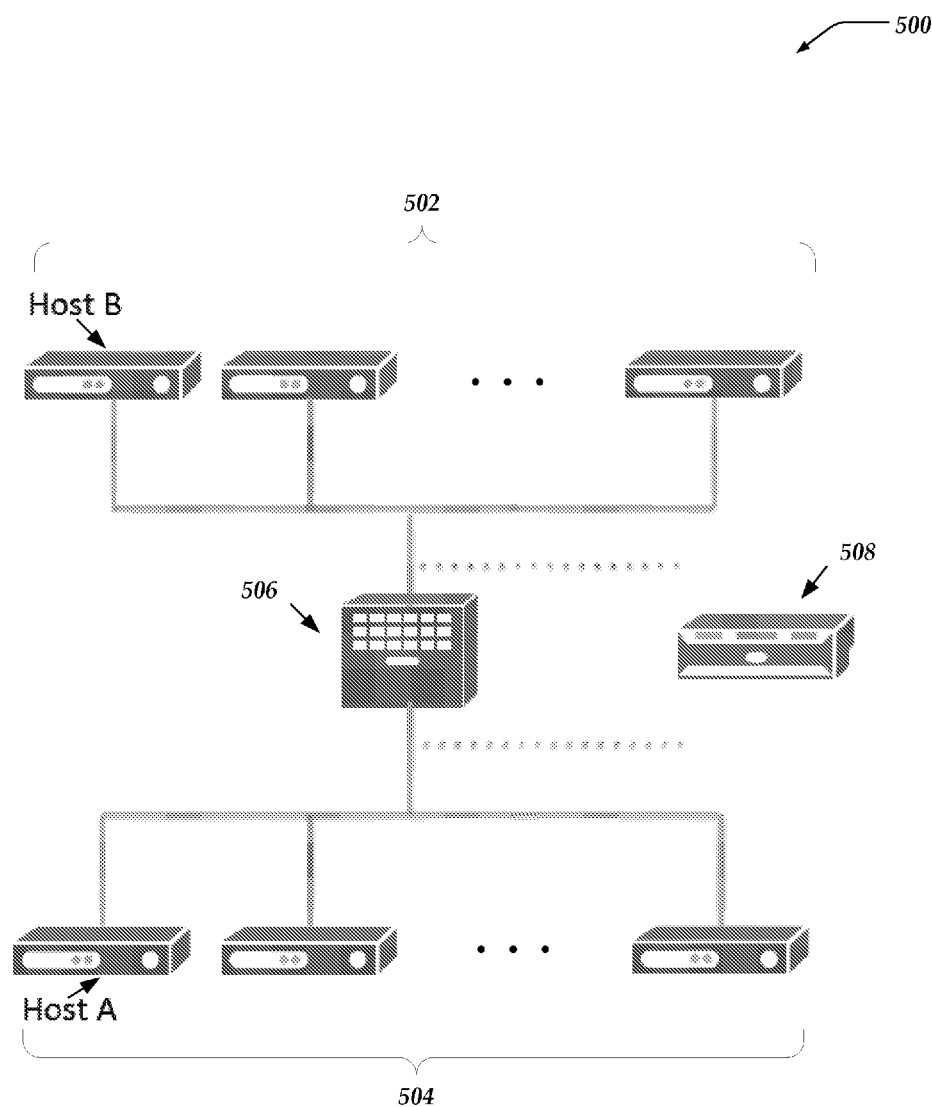
FIG. 5 illustrates a portion of a logical architecture for an NMD to passively monitor communication over at least one network.

FIG. 5 shows one embodiment of system 500 that includes a plurality of network devices on first network 502 and a plurality of network devices on second network 504. Communication between the first network and the second network is managed by switch 506. Also, NMD 508 is arranged to passively monitor and record packets that are communicated in flows between a network device on first network 502 and second network 504. For example, the communication of flows of packets between the Host B network device and the Host A network device are managed by switch 506 and network device 508 is operative to passively monitor and record these flows.

NMD 508 can receive network communication for monitoring through a variety of means including network taps, wireless receivers, port mirrors or directed tunnels from network switches, servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

General Operation

The operation of certain aspects of the invention will now be described with respect to FIGS. 6-11. In at least one of various embodiments, processes 600, 700, 800, 900, 1000, and 1100 are described in conjunction with FIGS. 6-11, respectively, may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3. However, embodiments are not so limited and various combinations of network devices, or the like, may be utilized.

Figure 6:
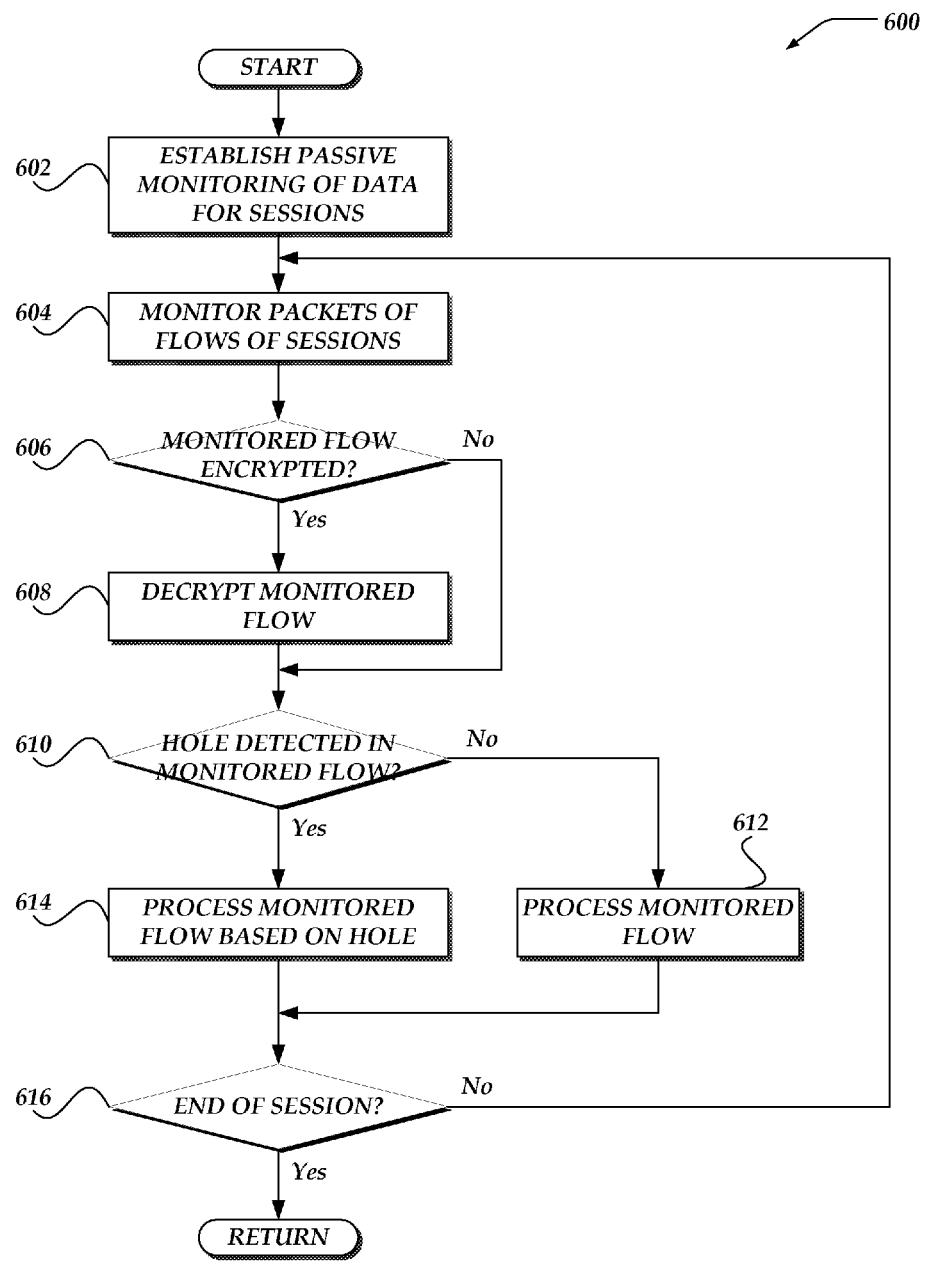
FIG. 6 illustrates a logical flow diagram generally showing one embodiment of an overview process for processing monitored data based on hole detection.

FIG. 6 illustrates a logical flow diagram generally showing one embodiment of an overview process for processing monitored flows based on hole detection. Process 600 may be begin, after a start block, at block 602, where passive monitoring of data for one or more sessions between two or more endpoints may be established. In some embodiments, process 600 may be employed for each of a plurality of different sessions between same or different endpoints. In some embodiments, the passive monitoring may be performed by a Network Monitoring Device (NMD) that receives copies data or packets associated with a session that are communicated over a network between endpoints. In some embodiments, the NMD may not participate in the transmission of the packets between the endpoints. In other embodiments, the NMD may participate in the transmission of packets between endpoints. In at least one such embodiment, the processing of the monitored packets may occur independent of such participation (i.e., passively monitor).

Process 600 may proceed to block 604, where one or more flows associated with the at least one session may be monitored. In at least one embodiment, a monitored flow may include streaming data and/or ordered stream data. In some embodiments, the NMD may receive the monitor flow through a network tap, wireless receiver, port mirrors, directed tunnels from network switches, or the like. In at least one embodiment, the monitored flow may include copied packets and/or copied data from packets transmitted between endpoints for a session. In some embodiments, the NMD may monitor a plurality of packets before further processing the monitored flow. For example, a plurality of packets may be monitored for reassembly and/or reconstruction of the flow for the session. Once the monitored flow is reassembled, additional processing of the monitored flow may be performed (e.g., the processing described at blocks 608, 614, and/or 612).

Process 600 may continue at decision block 606, where a determination may be made whether the monitored flow is encrypted. In some embodiments, this determination may be based on header information, such as an initialized encryption flag. In other embodiments, when a session is established between two endpoints, the NMD may observe one or more handshakes that negotiate and/or establish decryption keys for the session. However, embodiments are not so limited, and other mechanisms for determining if the monitored flow is encrypted may be employed. If the monitored flow is encrypted, then process 600 may proceed to block 608; otherwise, process 600 may proceed to decision block 610.

At block 608, the encrypted monitored flow may be decrypted. In some embodiments, the flow may be encrypted using a stream cipher, a block cipher, or the like. Embodiments described herein can be employed for many different cryptographic protocols, ciphersuites, and/or encryption/decryption algorithms. Some examples of cryptographic protocols and algorithms that may be used to encrypt/decrypt the flow may include, but are not limited to, Secure Sockets Layer (SSL), Transport Layer Security (TLS), Wired Equivalent Privacy or Wireless Encryption Protocol (WEP), WiFi Protected Access (WPA), RC4, Triple-DES, Advanced Encryption Standard (AES), or the like. Additionally, embodiments may be employed using any of a number of different encryption modes, including, but not limited to, Cipher-Block Chaining (CBC) mode, Cipher Feedback (CFB) mode, Counter (CTR) mode, Output Feedback (OFB) mode), or the like.

Figure 7:
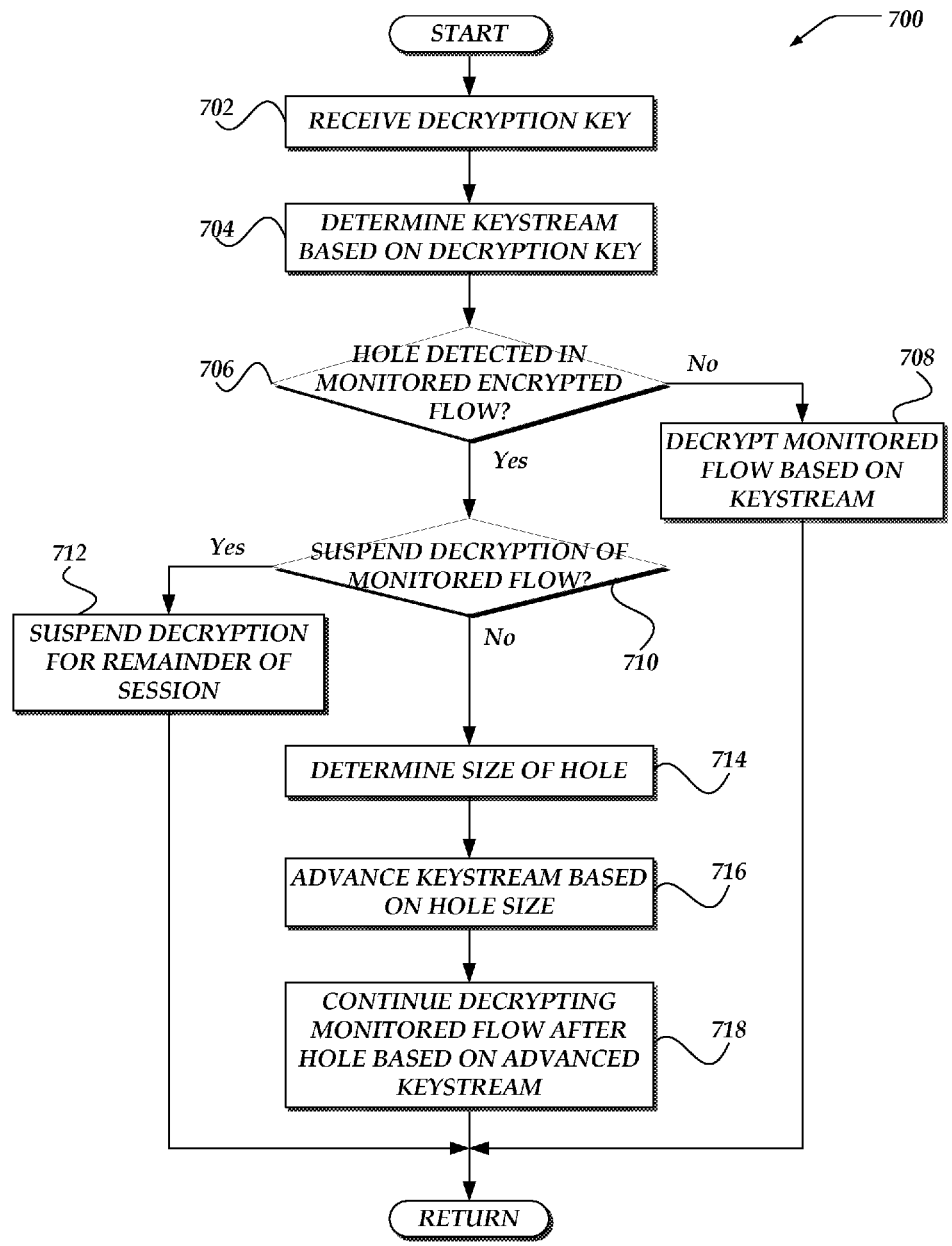
FIG. 7 illustrates a logical flow diagram generally showing one embodiment of a process for decrypting monitored data with a hole using a stream cipher.
Figure 8:
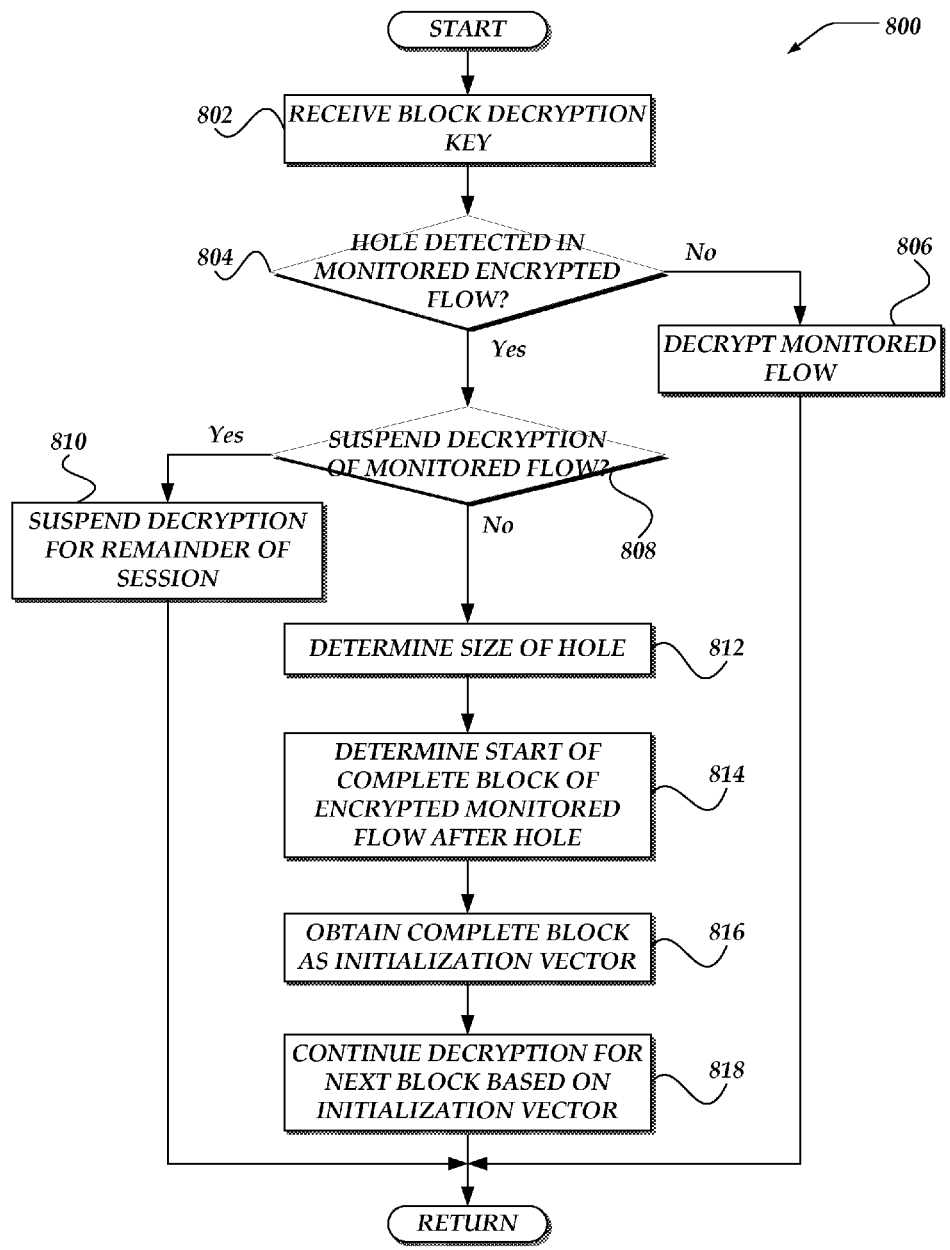
FIG. 8 illustrates a logical flow diagram generally showing one embodiment of a process for decrypting monitored data with a hole using a block cipher.

In some embodiments, the NMD may decrypt the encrypted monitored flow as it is received. However, in some embodiments, a hole may be detected in the monitored flow. Various embodiments for decrypting the encrypted monitored flow based on a detected hole are described in more detail below in conjunction with FIGS. 7 and 8. Briefly, process 700 of FIG. 7 illustrates a logical flow diagram of a process for decrypting an encrypted monitored flow using a stream cipher, whereas process 800 of FIG. 8 illustrates a logical flow diagram of a process for decrypting an encrypted monitored flow using a block cipher.

In any event, process 600 may proceed next to decision block 610, where a determination may be made whether a hole is detected in the monitored flow. In some embodiments, a hole may be detected if the packets received by the NMD are incomplete, or there are packets missing from the monitored flow. In at least one of various embodiments, a hole may be detected if one or more packets are missing based on sequence numbers, a combination (e.g., a hash) of sequence numbers and other protocol header information, or the like. One example of a TCP protocol header is illustrated in FIG. 12. Briefly, sequence number 1202 can be utilized for a plurality of packets associated with the monitored flow to determine if one or more packets are missing.

In other embodiments, a hole may be detected based on the simulated states of the endpoints. For example, the NMD may simulate the states of both endpoint A and endpoint B. If the NMD receives a packet that is associated with a state other than the simulated state, then the NMD may have missed one or more packets associated with a state transition—thus, detecting a hole.

In other embodiments, a hole may be detected once the NMD has identified that the packet loss it has detected was not experienced by the participants in the conversation. By way of illustration, TCP sends data in streams containing increasing sequence numbers. A TCP receiver acknowledges receipt of this data by reporting the next sequence number it expects to receive. When packet loss occurs between the sender and receiver, the receiver thus signals its failure to have received all packets. When the NMD identifies missing data in the stream, but the TCP receiver endpoint does not indicate that this data is missing, the presence of a hole is inferred.

Since a hole includes missing copies of packets successfully transmitted between two endpoints (e.g., network devices), additional analysis of the communication between the two endpoints may be performed to detect a hole. For example, if the NMD receives a copy of a response sent from endpoint A to endpoint B, but did not receive a copy of a request from endpoint B to endpoint A, then the NMD may infer that a request was successfully sent from endpoint B to endpoint A—thus, indicating a hole (i.e., the request sent from endpoint B to endpoint A). However, embodiments are not so limited and other mechanisms and/or algorithms may be employed to detect a hole in the monitored flow. If a hole is detected, process 600 may proceed to block 614; otherwise, process 600 may proceed to block 612.

At block 612, the monitored flow may be processed. In at least one of various embodiments, processing of the monitored data may include generating information based on the monitored flow. In some embodiments, the NMD may process the monitored flow as it is received. In other embodiments, a plurality of packets in the flow may be monitored prior to processing. In at least one of various embodiments, the processing may be per transaction (where a transaction may be a complete request-response transmission between endpoints), for a plurality of transactions, for a duration of a session, or the like, or any combination thereof.

In at least one embodiment, processing the monitor flow may be based on one or more conditions, parameters, analysis tools, or the like. The type of processing performed by the NMD may be selected and/or determined by a system administrator and/or other user of the NMD. In some embodiments, the processing may include extracting information from the monitored flow, including protocol information at various layers of the protocol stack. For example, in some embodiments, the processing may include analyzing information at one or more layers of the OSI protocol stack, such as layers 4 through 7. In some embodiments, the processing by the NMD may include classifying the network traffic (for one or more flows and/or one or more sessions) according to communication protocols that are used. The NMD may categorize the traffic where categories might include file transfers, streaming audio, streaming video, database access, interactive, gaming, or the like. In some embodiments, the NMD may determine whether the network traffic corresponds to known communications protocols, such as, for example, HTTP, FTP, SMTP, RTP, TDS, or the like.

These processes, and others, may be employed to provide an analysis and/or representation of activity on the network, such as, but not limited to, protocol dissection, transaction-level analysis, payload inspection, troubleshooting and proactive remediation, end-user experience monitoring, SLA monitoring, capacity planning, application lifecycle management, infrastructure change management, infrastructure optimization, business intelligence, security, regulatory compliance, or the like, or any combination thereof. The above examples of processing the monitored flows are not to be construed as limiting and/or exhaustive, and other types and/or or network analysis may be performed to process the monitored flows.

After block 612, process 600 may proceed to decision block 616.

If, at decision block 610, a hole is detected in the monitored flow, then process 600 may proceed from decision block 610 to block 614. At block 614, the monitored flow may be processed based on the detected hole (e.g., generating information based on the detected hole). Various embodiments for processing the monitored flow based on a hole are described in more detail below in conjunction with FIGS. 9-11. Briefly, the processing of the monitored flow may be employed independent of the detected hole (e.g., process 900 of FIG. 9), the processing of the monitored flow may continue after the hole if a known sequence of data is monitored (e.g., process 1000 of FIG. 10), or the processing of the monitored flow may continue after the hole based on a known sequence of data that is associated with traffic analysis (e.g., process 1100 of FIG. 11). In some embodiments, at least parts of processes 900, 1000, and/or 1100 may be employed in series or in parallel to determine if and/or when to continue processing the monitored flow.

In any event, process 600 may continue next at decision block 616, where a determination may be made whether the session between the endpoints has ended. In some embodiments, this determination may be based on a lack of data and/or packets being transmitted between the endpoints. In other embodiments, this determination may be based on the session timing out. In yet other embodiments, this determination may be based on a session termination handshake between the endpoints. If the session has ended, then processing may return to a calling process to perform other actions;

otherwise, process 600 may loop to block 604 to continue to monitor the flows for the session. As described above, process 600 or parts of process 600 may be employed for one or more flows for one or more sessions between endpoints.

FIG. 7 illustrates a logical flow diagram generally showing one embodiment of a process for decrypting an encrypted monitored flow with a hole using a stream cipher. Process 700 begins, after a start block, at block 702, where a decryption key may be received. In some embodiments, the decryption key may be received by the NMD when a session is established between the endpoints. In at least one embodiment, the NMD may obtain decryption keys for one or more sessions and/or one or more flows. In some embodiments, if the monitored flow is encrypted using SSL, TLS, or the like, then the NMD may have access to the server's private key and may be enabled to derive the corresponding decryption key or master secret from the SSL handshake between the endpoints. In other embodiments, if the monitored flow is encrypted using WEP, WPA, or the like, then the NMD may have access to the wireless station's pre-shared key and may be enabled to derive the corresponding decryption key.

Process 700 may proceed to block 704, where a keystream may be determined and/or generated based on the decryption key. In at least one embodiment, the keystream may be generated from the received decryption key depending on the cyphersuite employed to encrypt the monitored flow.

Process 700 may continue at decision block 706, where a determination may be made whether a hole is detected in the encrypted monitored flow. In at least one of various embodiments, decision block 706 may employ embodiments of decision block 610 of FIG. 6 to determine if there is a hole in the monitored flow. If a hole is detected, then process 700 may proceed to decision block 710; otherwise, process 700 may proceed to block 708.

At block 708, the encrypted monitored flow may be decrypted based on the keystream. In at least one embodiment, the keystream may be XOR (or other mathematical and/or logical combination) with the encrypted monitored flow to produce/determine a decrypted monitored flow. After block 708, process 700 may return to a calling process to perform other actions (e.g., to resynchronize the processing at block 614 because a hole is detected).

If, at decision block 706, a hole is detected, then process 700 may proceed from decision block 706 to decision block 710. At decision block 710, a determination may be made whether to suspend decryption of the encrypted monitored flow. In some embodiments, this determination may be based on the nature and/or type of data being transferred between the endpoints, a type of processing performed by the NMD, a communication protocol in use, a size of the hole, where the hole occurs during the data transfer, or the like, or any combination thereof. For example, in some embodiments, the NMD may determine (e.g., to save processing resources) that the flow associated with the current session does not need to be processed, and decryption may be suspended. In other embodiments, decryption may be suspended if the hole spans multiple transactions, a size of the hole cannot be determined, or the like.

In yet other embodiments, the determination of whether to suspend decryption of the encrypted monitored flow may depend on whether the NMD is enabled to decrypt the encrypted monitored flow. For example, in some embodiments, the NMD may obtain a partial copy (or no copy at all) of the decryption key (possibly because of the hole). If the NMD did not obtain an appropriate decryption key for the session, then decryption may be suspended. However, embodiments are not so limited, and other mechanism may be employed to determine if the decryption may be suspended. If the decryption may be suspended, then process 700 may proceed to block 712; otherwise, process 700 may proceed to block 714.

At block 712, the decryption of the encrypted monitored flow may be suspended for the remainder of the session. In some embodiments, decryption may restart and/or continue if a new session is established. In at least one embodiment, the decryption may be suspended until a new decryption key is obtained. In at least one of various embodiment, the NMD may continue to monitor the data transmitted between the endpoints to determine if the session has ended, a new session has been established, a new decryption key is negotiated, or the like. After block 712, process 700 may return to a calling process to perform other actions.

If, at decision block 710, the decryption may not be suspended, process 700 may proceed from decision block 710 to block 714. At block 714, a size of the hole may be determined. In some embodiments, the size of the hole may be inferred from a number of missing packets (e.g., as determined by sequence numbers) and a size of each packet. However, embodiments are not so limited, and other mechanisms for determining the size of the hole may be employed.

Process 700 may proceed next to block 716, where the keystream may be advanced based on the size of the hole. In some embodiments, the keystream may be advanced from a position in the keystream prior the encountering the hole to a position in the keystream after the hole. In at least one embodiment, advancing the keystream may include generating and discarding a number of bits or bytes of the keystream that correspond to the hole, e.g., the number of discarded bits or bytes may be equal to the size of the hole. So, decryption of the encrypted monitored flow can continue (at block 718) after the hole, as if the hole did not occur. For example, assume one byte of keystream is generated for each byte of the encrypted monitored flow, and that the detected hole is 32 bytes. In this example, the next 32 bytes of the keystream may be generated and discarded (and/or ignored), and the decryption of the monitored flow may continue (at block 718) at the first byte of monitored flow the after the hole.

Process 700 may continue at block 718, where the decryption of the encrypted monitored flow may continue after the hole (i.e., downstream of the hole) based on the advanced keystream. In at least one of various embodiments, block 718 may employ embodiments of block 708 to decrypt the encrypted monitored flow, but starting with the monitored flow after the hole and employing the advanced keystream.

In some other embodiments, after the hole is detected, the NMD may choose to skip additional data and/or packets before resuming decryption after the hole. In at least one embodiment, this decryption may resume at a known boundary, such as a record boundary. For example, some cryptographic protocols, such as SSL and TLS, may be record based, so the NMD may resume decryption at the next record boundary, rather than immediately after the hole. In at least one such embodiment, the keystream may be advanced based on the hole (as described above), and may continue to be advanced until a next record and decryption resumes.

After block 718, process 700 may return to a calling process to perform other actions. In some embodiments, process 700 may be employed with ciphersuites that decrypt blocks of data and utilize a keystream. For example, in a Counter (CTR) mode, a block cipher may be used to generate a keystream by encrypting a counter. In this example, embodiments similar to those described above may be employed to advance the keystream according to the size of the detected hole. Similarly, in an Output Feedback (OFB) mode, a keystream may be generated by decrypting a previous block of keystream, which, by employing embodiments described above, may be advanced according to the size of the hole.

FIG. 8 illustrates a logical flow diagram generally showing one embodiment of a process for decrypting an encrypted monitored flow with a hole using a block cipher. In some embodiments, the block cipher may be employed in a Cipher-Block Chaining mode, a Cipher Feedback mode, or the like. Process 800 begins, after a start block, at block 802, where a block decryption key may be received. In some embodiments, the decryption key may be received when a session is established. However, embodiments are not so limited, and other mechanisms may be employed to receive and/or obtain a decryption key. In some embodiments, an initialization vector may be generated for use in decrypting a first block of the encrypted monitored flow.

Process 800 may continue at decision block 804, where a determination may be made whether a hole is detected in the encrypted monitored flow. In at least one of various embodiments, decision block 804 may employ embodiments of decision block 706 of FIG. 7 to determine if there is a hole. If a hole is detected, then process 800 may proceed to decision block 808; otherwise, process 800 may proceed to block 806.

At block 806, the encrypted monitored flow may be decrypted based on the received block decryption key. In various embodiments, the encrypted monitored flow may be decrypted in blocks. A first block of the monitored flow may be decrypted based on an initially generated initialization vector and the decryption key. Subsequence blocks of the monitored flow may be decrypted based on the block decryption key and a previous encrypted or unencrypted block of data. After block 806, process 800 may return to a calling process to perform other actions.

If, at decision block 806, a hole is detected, then process 800 may proceed from decision block 804 to decision block 808. At decision block 808, a determination may be made whether to suspend decryption of the encrypted monitored flow. In at least one embodiment, decision block 808 may employ embodiments of decision block 710 of FIG. 7 to determine if decryption may be suspended. If the decryption may be suspended, then process 800 may proceed to block 810; otherwise, process 800 may proceed to block 812.

At block 810, the decryption of the encrypted monitored flow may be suspended for the remainder of the connection. In at least one of various embodiments, block 810 may employ embodiments of block 712 of FIG. 7 to suspend decryption for the remainder of the connection. After block 810, process 800 may return to a calling process to perform other actions.

If, at decision block 808, the decryption may not be suspended, process 800 may proceed from decision block 808 to block 812. At block 812, a size of the hole in the encrypted monitored flow may be determined. In at least one of various embodiments, block 812 may employ embodiments of block 714 of FIG. 7 to determine a size of the hole.

Process 800 may proceed next to block 814, where a start of a next complete block of encrypted data in the monitored flow after the hole may be determined. In some embodiments, the start of the next complete block may be determined based on the size of the hole and a size of each block of monitored flow (or a multiple of the size of the blocks). For example, assume there are 60 blocks of data (e.g., block 1 through block 60) in the monitored flow, each block is 8 bytes, and a detected hole is 35 bytes. If the hole starts at the beginning of block 7 (i.e., starts at byte 56 and ends at byte 90), then the start of the next complete block of the monitored flow after the hole may be at block 12 (i.e., byte 96). It should be understood that other numbers of blocks, sizes of blocks, size of hole, start and end locations of the hole within the monitored flow may occur and/or may be employed.

Process 800 may continue at block 816, where the next complete block of encrypted data in the monitored flow may be obtained. In at least one embodiment, this next complete block may be employed as a new initialization vector for decrypting at least one following block of data in the monitored flow. Continuing the example above, the next complete block of data in the monitored flow may be block 12.

In any event, process 800 may proceed to block 818, where the following block of data in the encrypted monitored flow may be decrypted based on the new initialization vector and the decryption key. Continuing the example above, block 13 may be decrypted by employing the decryption key and by utilizing block 12 as the new initialization vector. In various embodiments, the decryption of the monitored flow may continue (e.g., as at block 818) until another hole is detected.

In some other embodiments, after the hole is detected, the NMD may choose to skip additional data and/or packets before resuming decryption after the hole. In at least one embodiment, this decryption may resume at a known boundary, such as a record boundary. For example, some cryptographic protocols, such as SSL and TLS, may be record based, so the NMD may resume decryption at the next record boundary, rather than immediately after the hole. In at least one such embodiment, the last block before a next record and/or a first block of the next record may be determined to be the initialization vector to resume decryption.

After block 818, process 800 may return to a calling process to perform other actions (e.g., to monitor and/or decrypt additional data).

In some embodiments, process 800 or parts of process 800 may be employed with process 700 or parts of process 700 to both perform block decryption and to advance a keystream due to a hole detected in a monitored flow.

Figure 9:
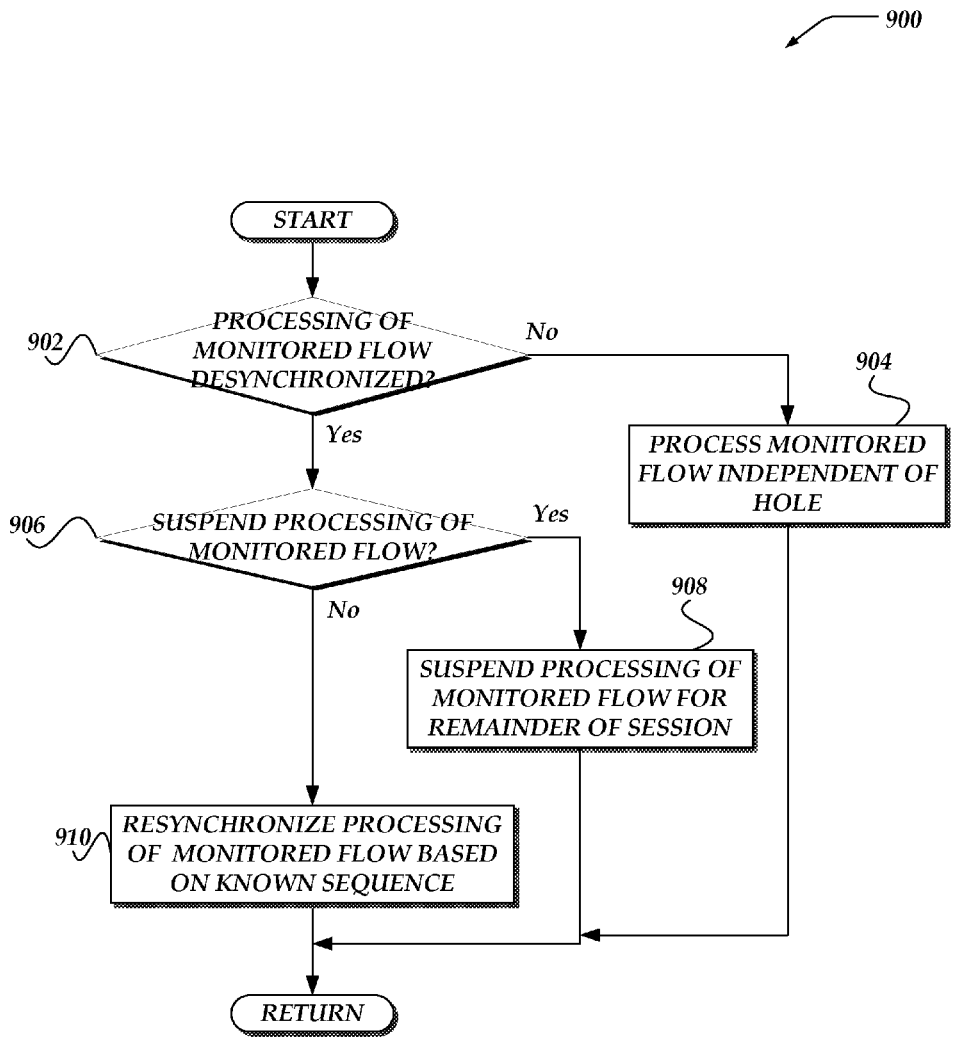
FIG. 9 illustrates a logical flow diagram generally showing one embodiment of a process for processing monitored data independent of a detected hole.
Figure 10:
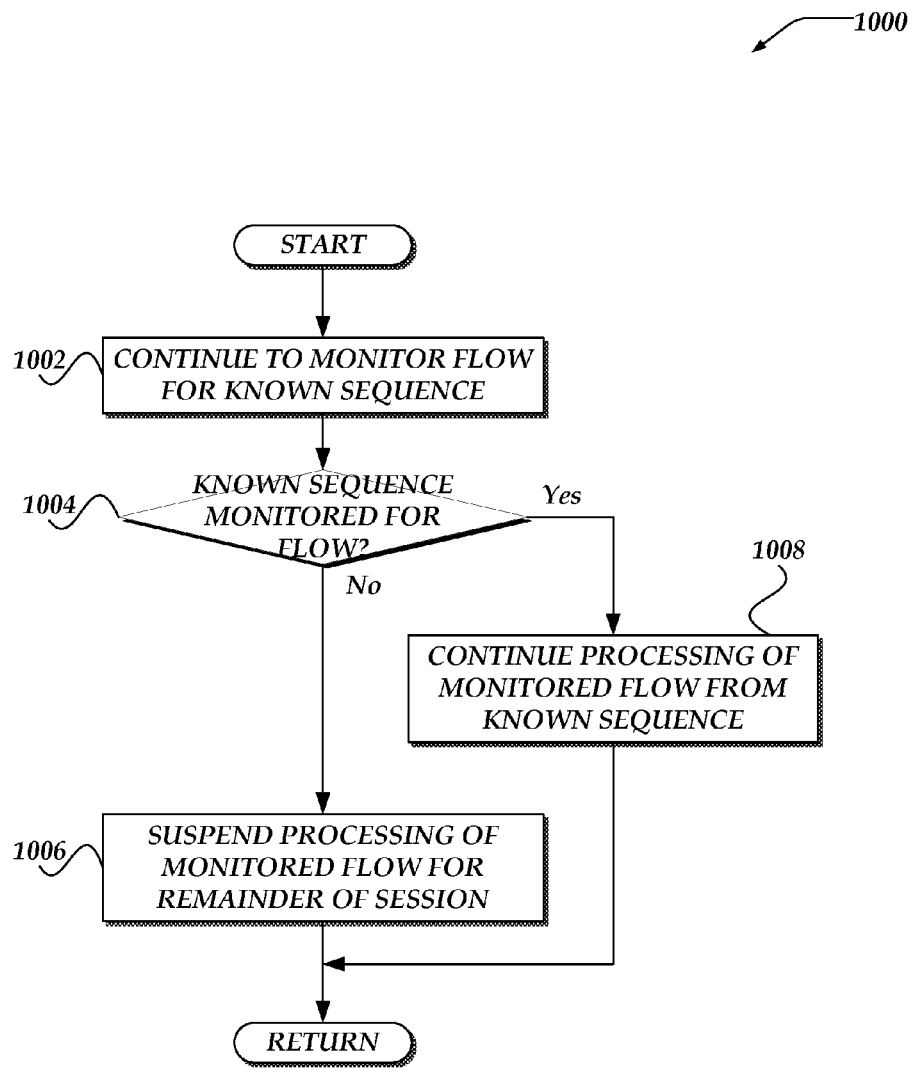
FIG. 10 illustrates a logical flow diagram generally showing one embodiment of a process for continuing the processing of monitored data after a detected hole based on a known sequence of data.
Figure 11:
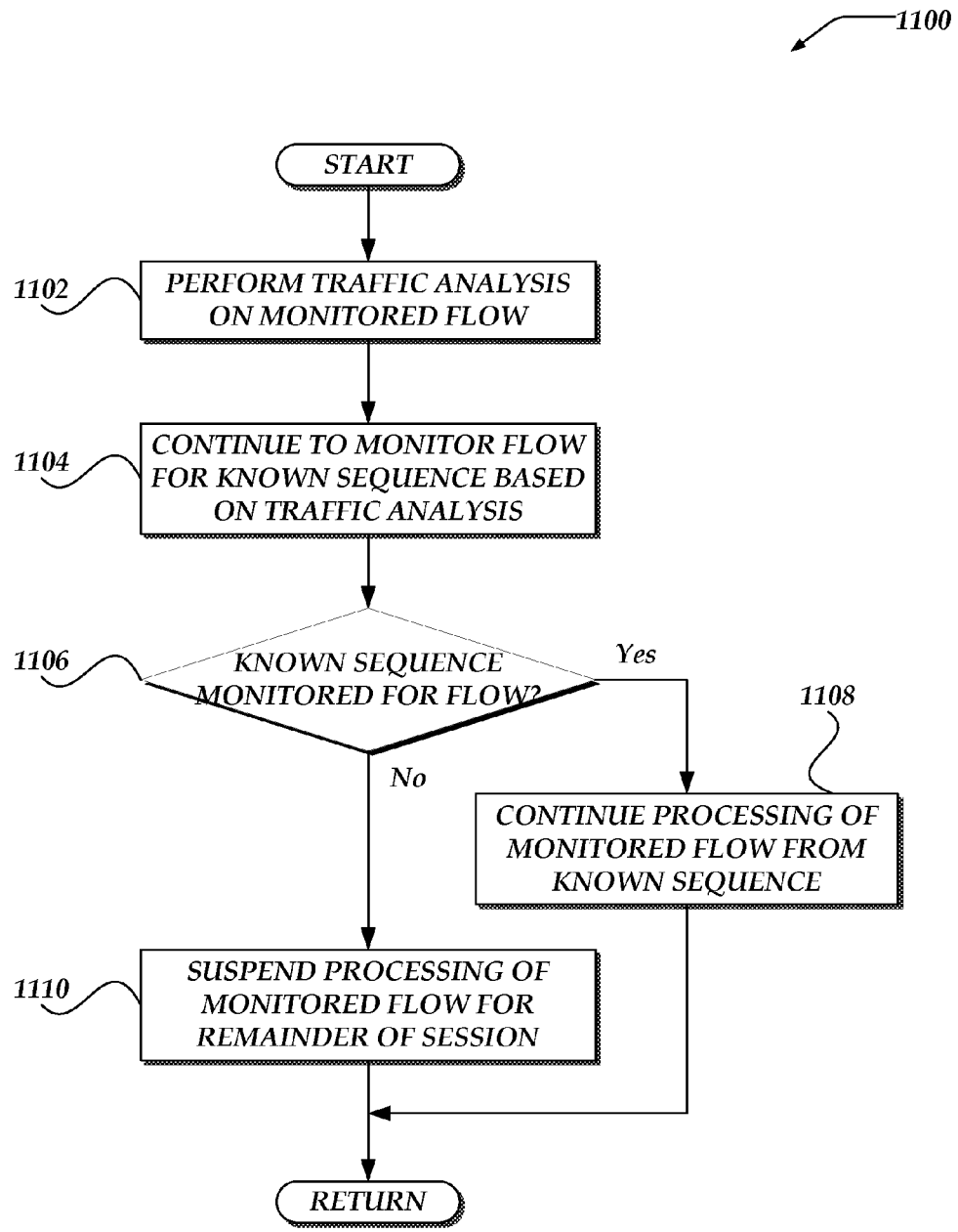
FIG. 11 illustrates a logical flow diagram generally showing one embodiment of a process for continuing the processing of monitored data after a detected hole based on a known sequence of data in conjunction with traffic analysis.

In some embodiments, if the monitored flow is unencrypted and a hole was detected, then processes 900, 1000, and/or 1100 of FIGS. 9, 10, and 11, respectively, may be employed after a hole is detected. In other embodiments, if the monitored flow is encrypted and a hole was detected, then processes 900, 1000, and/or 1100 of FIGS. 9, 10, and 11, respectively, may be employed after decryption of the monitored flow is resumed after the detected hole (as described in process 700 of FIG. 7 and/or process 800 of FIG. 8). So, in some embodiments, after decryption is resumed after encountering a hole (e.g., at block 718 of FIG. 7 and/or at block 818 of FIG. 8), the NMD may determine if it is in a desynchronized state and try to resynchronize as described herein.

FIG. 9 illustrates a logical flow diagram generally showing one embodiment of a process for processing a monitored flow independent of a detected hole. Process 900 begins, after a start block, at decision block 902, where a determination may be made whether the processing (e.g., the generating of information regarding the monitored flow) of the monitored flow may be desynchronized. In at least one embodiment, this determination may be based on the nature and/or type of data being transferred between the endpoints, a type of processing performed by the NMD, a communication protocol in use, a size of the hole, where the hole occurs during the data transfer, or the like, or any combination thereof. In various embodiments, this determination may include determining if the NMD is in a desynchronized state.

For example, if the NMD is analyzing the monitored flow to determine how long it takes to transfer a file between two endpoints—and a size of the hole can be determined and/or inferred—the size of the hole can be subtracted from the amount of data remaining to be transferred. In this example, the processing may remain synchronized if the hole occurs within the flow of data corresponding to the file. However, if the hole extends beyond the end of the file, then the NMD may not know if and/or when the transfer completed and the processing may be desynchronized. If the processing of the monitored flow may be desynchronized, then process 900 may proceed to decision block 906; otherwise, process 900 may proceed to block 904.

At block 904, the monitored flow may be processed independently of the detected hole. In at least one of various embodiments, block 904 may employ embodiments of block 612 of FIG. 6 to process and/or generate information regarding and/or based on the monitored flow. So, in some embodiments, the hole may be ignored, such as, for example, if the flow is being monitored for a particular packet (noting that if the particular packet was transferred during the hole, the NMD may exceed a timeout period waiting for packet that was already transferred, but was missed). Yet, in other embodiments, the size of the hole may be employed in the processing of the monitored flow, such as in the timing of the file transfer example above. In any event, after block 904, process 900 may return to a calling process to perform other actions.

If, at decision block 902, the processing of the monitored flow is desynchronized, then process 900 may proceed from decision block 902 to decision block 906. At decision block 906, a determination may be made whether the processing of the monitored flow may be suspended. In some embodiments, this determination may be based on the nature and/or type of data being transferred between the endpoints, a type of processing performed by the NMD, a communication protocol in use, a size of the hole, where the hole occurs during the data transfer, or the like, or any combination thereof. For example, in some embodiments, the NMD may determine (e.g., to save processing resources) that the monitored flow does not need to be processed, and processing may be suspended. However, embodiments are not so limited and other mechanisms may be employed to determine if the processing should be suspended due to the hole. If the processing of the monitored flow may be suspended, then process 900 may proceed to block 908; otherwise; process 900 may proceed to block 910.

At block 908, the processing of the monitored flow may be suspended for a remainder of the session. In some embodiments, processing may restart and/or continue if a new session is established. In at least one of various embodiment, the NMD may continue to monitor the data communicated between the endpoints to determine if the session has ended, a new session has been established, or the like. After block 908, process 900 may return to a calling process to perform other actions.

If at decision block 906, the processing of the monitored flow may not be suspended, then process 900 may proceed from decision block 906 to block 910. At block 910, the processing of the monitored flow may be resynchronized based on a known sequence of data. In at least one of various embodiments, the processing may be resynchronized by resuming the processing of the monitored flow at a downstream position of the flow based on at least one aspect of the hole. In at least one embodiment, an aspect of the hole may include a size of the hole, a location/position of the hole in the monitored flow, or the like. Various embodiments of processing the monitored flow based on a known sequence of data may be described herein in conjunction with FIGS. 10 and 11. Briefly, however, the processing may continue and/or restart if a known sequence of data is included in the monitored flow after the hole (e.g., downstream of the hole in the monitored flow).

After block 910, process 900 may return to a calling process to perform other actions.

FIG. 10 illustrates a logical flow diagram generally showing one embodiment of a process for continuing the processing of a monitored flow after a detected hold based on a known sequence of data. Process 1000 begins, after a start block, at block 1002, where the monitored flow may be analyzed for a known sequence of data. In some embodiments, the data communicated between the endpoints may continue to be monitored to determine if a known sequence is included in the flow. In some embodiments, heuristics may be employed to determine the known sequence. In some embodiments, the heuristics may be an engineering estimate and/or determination of a predetermined pattern of bits/bytes that may be included in the flow (e.g., a record header). In other embodiments, the heuristics may employ historical data to determine the known sequence of data (e.g., employed machine learning algorithms to determine data patterns that may indicate communication boundary that may enable resynchronization of the possessing of the monitored flow).

In some embodiments, the known sequence of data may be a simple sequence or a complex sequence of data. The known sequence may be static (e.g., a predetermined number and/or combination of bits/bytes) or dynamic. In some embodiments, the known sequence may be a record header, a start/end of transaction marker, or the like. In other embodiments, the known sequence may be based on length values, transaction identifiers, timestamps, or the like. In some embodiments, the known sequence may be unique compared to other data transmitted between the endpoints (e.g., packet payload data), such as, for example, some protocols may guarantee that record headers or transaction markers may be unique in the data stream (e.g., the protocol might encode the data contained in the record or transaction (e.g., record payload) in such a way that is cannot resemble the record header or transaction marker). Other protocols might employ length-prefixed records such that arbitrary data may be contained within the length of the record, in which case, the known sequence may include a probability determination to determine if the record header is sufficiently unique to be employed as the known sequence of data (e.g., the larger the record header, the more probable the record header is unique compared to the data contained in the record (e.g., record payload)).

In any event, process 1000 may proceed to decision block 1004, where a determination may be made whether a known sequence of data is monitored. In at least one embodiment, this determination may be based on a comparison of data included in the monitored flow and one or more known sequences. If a known sequence of data is included in the monitored flow, then process 1000 may proceed to block 1008; otherwise, process 1000 may proceed to block 1006. In some embodiments, if a known sequence is not found, then process 1000 may loop (not shown) to block 1002 look for a known sequence. In at least one embodiment, this looping may occur one or more times before process 1000 proceeds to block 1006 to suspend the processing of the monitored flow.

At block 1008, the processing (or generating of information) of the monitored flow may be restarted and/or continued from the known sequence of data. As described herein, the known sequence of data may indicate a position in the monitored flow from which the processing can continue. In at least one embodiment, block 1008 may employ embodiments of block 612 of FIG. 6 to process the monitored flow after the known sequence of data in the monitored flow. After block 1008, process 1000 may return to a calling process to perform other actions.

If, at decision block 1004, a known sequence of data is not included in the monitored flow, then process 1000 may proceed from decision block 1004 to block 1006. At block 1006, the processing of the monitored flow may be suspended for the remainder of the session. In at least one of various embodiments, block 1006 may employ embodiments of block 908 of FIG. 9 to suspend processing for the remainder of the session.

After block 1006, process 1000 may return to a calling process to perform other actions.

FIG. 11 illustrates a logical flow diagram generally showing one embodiment of a process for continuing the processing of a monitored flow after a detected hold based on a known sequence of data in conjunction with traffic analysis. Process 1100 begins, after a start block, at block 1102, where traffic analysis may be performed on the monitored flow. This traffic analysis may provide an indication of where a known sequence of data may start and/or end.

In some embodiments, the traffic analysis may include turn detection. Turn detection may include analyzing the monitored flow to determine if data is flowing in one direction (e.g., from network device A to network device B) followed by data flowing in the other direction (e.g., from network device B to network device A). This change of flow direction may, for some protocols, indicate a request-response pattern. In some such embodiments, every other turn may correspond to a new transaction. In various embodiments, if a turn is detected, then the NMD may search for a known sequence (at block 1104) that corresponds to the protocol request or response at the beginning of the turn.

In other embodiments, the traffic analysis may include timing analysis. Timing analysis may include monitoring the flow for a pause in the data exchange or some other timing conditions and/or constraints. This pause or a specific timing pattern may indicate a request-response boundary, transaction boundary, or other known communication arrangement. In various embodiments, the NMD may search for a known sequence (at block 1104) based on the timing analysis.

In yet other embodiments, the traffic analysis may include role analysis. Role analysis may include monitoring the flow to determine which endpoint(s) is a client and which endpoint(s) is a server. In various embodiments, the NMD may search for a known sequence (at block 1104) based on whether a client is sending the data or the server is sending the data.

In some other embodiments, the traffic analysis may include a protocol analysis. Protocol analysis may include analyzing information in the protocol to determine if there is communication and/or record boundary that may have a corresponding known sequence of data. In some embodiments, a communication boundary may be a sequence of data associated with a particular communication from an endpoint, such as, for example, a start/end of a transaction between endpoints, a start/end of a record, or the like. For example, the transport protocol may be analyzed to determine if the TCP PUSH flag may be set on segments that correspond to a buffer boundary in the application. In another example, the transport protocol, such as Stream Control Transmission Protocol (SCTP), can include explicit record boundaries. In various embodiments, the NMD may search for a known sequence (at block 1104) based on information in the protocol.

The above examples and embodiments of different traffic analysis are not to be construed as limiting or exhaustive, but rather, other traffic analysis, combinations of traffic analysis, or the like may be employed.

Process 1100 may proceed to block 1104, where a known sequence of data in the monitored flow may be determined based on a result of the traffic analysis. In at least one embodiment, block 1104 may employ embodiments of block 1002 of FIG. 10 to monitor the flow for a known sequence of data, but where the known sequence of data corresponds to the result of the traffic analysis. For example, the NMD may perform traffic analysis to detect a turn. Once the turn is detected, the NMD may analyze the monitored flow to determine if there is a known sequence of data associated with the turn. However, embodiments are not so limited and other mechanism for determining a known sequence of data based on traffic analysis may be employed.

Process 1100 may continue at decision block 1106, where a determination may be made whether a known sequence of data is included in the monitored flow based on the traffic analysis. In at least one embodiment, decision block 1106 may employ embodiments of decision block 1004 of FIG. 10 to determine if a known sequence is include in the monitored flow. In some other embodiments, this determination may be based on a comparison of data within the monitored flow that is associated with the traffic analysis with at least one known sequence of data. If a known sequence of data is included in the monitored flow and is associated with the traffic analysis, then process 1100 may proceed to block 1108; otherwise, process 1100 may proceed to block 1110. In some embodiments, if a known sequence is not found, then process 1100 may loop (not shown) to block 1102 and/or 1104 to re-perform the traffic analysis and/or to look for a known sequence. In at least one embodiment, this looping may occur one or more times before process 1100 proceeds to block 1110 to suspend the processing of the monitored flow.

At block 1108, the processing (or generating of information) of the monitored flow may be restarted and/or continued based on the known sequence of data. In at least one of various embodiments, block 1108 may employ embodiments of block 1008 of FIG. 10 for restarting the processing of monitored flow based on a known sequence of data. After block 1108, process 1100 may return to a calling process.

If, at decision block 1106, a known sequence of data is not determined to be associated with the traffic analysis, then process 1100 may proceed from decision block 1106 to block 1110. At block 1110, the processing of the monitored flow may be suspended for the remainder of the session. In at least one of various embodiments, block 1110 may employ embodiments of block 1006 of FIG. 10 to suspend processing for the remainder of the session.

After block 1110, process 1100 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Use Case Illustration

FIG. 12 illustrates one embodiment of a use case of a TCP protocol header. In some embodiments, information from a protocol header may be employed to determine if a hole is included in the monitored flow. For example, sequence numbers of packets associated with the monitored flow may be compared to determine if there are packets missing (e.g., missing sequence numbers). If one or more packets are missing, then a hole may be determined to be present in the monitored flow.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for monitoring packets of data over a network, wherein at least one network device enables actions, comprising:
   passively monitoring at least one flow of packets for a session between at least two endpoints based on copies of the packets for the at least one monitored flow, wherein transmission of the packets between the at least two endpoints is performed separate from the passive monitoring;
   generating information based on the copies of packets for the at least one monitored flow;
   if the at least one monitored flow is encrypted and is being decrypted based on at least a generated keystream, advancing the generated keystream based on at least a size of a hole detected in the at least one monitored flow, wherein the advanced keystream is employed to continue decryption after the hole;
   determining if the generating of information is desynchronized from the at least one monitored flow based at least on a detection of the hole in the at least one monitored flow; and
   if the generating of information is determined to be desynchronized, re-synchronizing the generating of information based at least on resuming the generating of information at a downstream position of the at least one monitored flow that is after the hole and is based on at least one aspect of the hole.

2. The method of claim 1, wherein if the generating is desynchronized, performing other actions, including suspending the generating of information until it is resynchronized based at least on a size of the hole.

3. The method of claim 1, wherein if the generating is desynchronized, performing other actions, including suspending the generating of information for a remainder of the session.

4. The method of claim 1, wherein if the generating is desynchronized, performing other actions, including if a known sequence of data is determined to be included after the hole in the at least one monitored flow, continuing the generating of information based on the known sequence of data.

5. The method of claim 1, wherein if the generating is desynchronized, performing other actions, including:
   performing a traffic analysis on the at least one monitored flow after detecting the hole;
   determining if a known sequence of data is included in the at least one monitored flow based on a result of the traffic analysis; and
   if the known sequence of data is included in the at least one monitored flow, continuing the generating of information based on the known sequence of data.

6. The method of claim 1, further comprising:
   if the at least one monitored flow is determined to be encrypted, employing a block decryption key to decrypt the encrypted monitored flow;
   determining an initialization vector based on a complete block of the at least one encrypted monitored flow after detecting the hole; and
   employing the initialization vector to continue decryption of the encrypted monitored flow after detecting the complete block.

7. The method of claim 1, wherein the hole includes one or more of the packets associated with the at least one monitored flow that are successfully communicated between the at least two endpoints and corresponding copies of the packets are dropped before the generating of information.

8. A network device for monitoring packets of data over a network, comprising:
   a memory for storing data and instructions; and
   a processor that executes the instructions to enable actions, including:
      passively monitoring at least one flow of packets for a session between at least two endpoints based on copies of the packets for the at least one monitored flow, wherein transmission of the packets between the at least two endpoints is performed separate from the passive monitoring;
      generating information based on the copies of packets for the at least one monitored flow;
      if the at least one monitored flow is encrypted and is being decrypted based on at least a generated keystream, advancing the generated keystream based on at least a size of a hole detected in the at least one monitored flow, wherein the advanced keystream is employed to continue decryption after the hole;
      determining if the generating of information is desynchronized from the at least one monitored flow based at least on a detection of the hole in the at least one monitored flow; and
      if the generating of information is determined to be desynchronized, re-synchronizing the generating of information based at least on resuming the generating of information at a downstream position of the at least one monitored flow that is after the hole and is based on at least one aspect of the hole.

9. The network device of claim 8, wherein if the generating is desynchronized, performing other actions, including suspending the generating of information until it is resynchronized based at least on a size of the hole.

10. The network device of claim 8, wherein if the generating is desynchronized, performing other actions, including suspending the generating of information for a remainder of the session.

11. The network device of claim 8, wherein if the generating is desynchronized, performing other actions, including if a known sequence of data is determined to be included after the hole in the at least one monitored flow, continuing the generating of information based on the known sequence of data.

12. The network device of claim 8, wherein if the generating is desynchronized, performing other actions, including:
   performing a traffic analysis on the at least one monitored flow after detecting the hole;
   determining if a known sequence of data is included in the at least one monitored flow based on a result of the traffic analysis; and
   if the known sequence of data is included in the at least one monitored flow, continuing the generating of information based on the known sequence of data.

13. The network device of claim 8, further comprising:
   if the at least one monitored flow is determined to be encrypted, employing a block decryption key to decrypt the encrypted monitored flow;
   determining an initialization vector based on a complete block of the at least one encrypted monitored flow after detecting the hole; and
   employing the initialization vector to continue decryption of the encrypted monitored flow after detecting the complete block.

14. The network device of claim 8, wherein the hole includes one or more of the packets that are successfully communicated between the at least two endpoints and corresponding copies of the packets are dropped before the generating of information.

15. A system for monitoring packets of data over a network, comprising:
   at least two endpoints, wherein each of the at least two endpoint at least includes:
      a transceiver that is operative to communicate at least with at least one other endpoint over the network; and
   at least one network device, including:
      a memory for storing data and instructions; and
      a processor that executes the instructions to enable actions, including:
         passively monitoring at least one flow of packets for a session between the at least two endpoints based on copies of the packets for the at least one monitored flow, wherein transmission of the packets between the at least two endpoints is performed separate from the passive monitoring;
         generating information based on the copies of packets for the at least one monitored flow:
         if the at least one monitored flow is encrypted and is being decrypted based on at least a generated keystream, advancing the generated keystream based on at least a size of a hole detected in the at least one monitored flow, wherein the advanced keystream is employed to continue decryption after the hole;
         determining if the generating of information is desynchronized from the at least one monitored flow based at least on a detection of the hole in the at least one monitored flow; and
         if the generating of information is determined to be desynchronized, re-synchronizing the generating of information based at least on resuming the generating of information at a downstream position of the at least one monitored flow that is after the hole and is based on at least one aspect of the hole.

16. The system of claim 15, wherein if the generating is desynchronized, performing other actions, including suspending the generating of information until it is resynchronized based at least on a size of the hole.

17. The system of claim 15, wherein if the generating is desynchronized, performing other actions, including suspending the generating of information for a remainder of the session.

18. The system of claim 15, wherein if the generating is desynchronized, performing other actions, including if a known sequence of data is determined to be included after the hole in the at least one monitored flow, continuing the generating of information based on the known sequence of data.

19. The system of claim 15, wherein if the generating is desynchronized, performing other actions, including:
   performing a traffic analysis on the at least one monitored flow after detecting the hole;
   determining if a known sequence of data is included in the at least one monitored flow based on a result of the traffic analysis; and
   if the known sequence of data is included in the at least one monitored flow, continuing the generating of information based on the known sequence of data.

20. The system of claim 15, further comprising:
   if the at least one monitored flow is determined to be encrypted, employing a block decryption key to decrypt the encrypted monitored flow;
   determining an initialization vector based on a complete block of the at least one encrypted monitored flow after detecting the hole; and
   employing the initialization vector to continue decryption of the encrypted monitored flow after detecting the complete block.

21. A processor readable non-transitory storage media that includes instructions for monitoring packets of data over a network, wherein the execution of the instructions by a processor enables actions, comprising:
   passively monitoring at least one flow of packets for a session between at least two endpoints based on copies of the packets for the at least one monitored flow, wherein transmission of the packets between the at least two endpoints is performed separate from the passive monitoring;
   generating information based on the copies of packets for the at least one monitored flow;
   if the at least one monitored flow is encrypted and is being decrypted based on at least a generated keystream, advancing the generated keystream based on at least a size of a hole detected in the at least one monitored flow, wherein the advanced keystream is employed to continue decry non after the hole;
   determining if the generating of information is desynchronized from the at least one monitored flow based at least on a detection of the hole in the at least one monitored flow; and
   if the generating of information is determined to be desynchronized, re-synchronizing the generating of information based at least on resuming the generating of information at a downstream position of the at least one monitored flow that is after the hole and is based on at least one aspect of the hole.

22. The media of claim 21, wherein if the generating is desynchronized, performing other actions, including suspending the generating of information until it is resynchronized based at least on a size of the hole.

23. The media of claim 21, wherein if the generating is desynchronized, performing other actions, including suspending the generating of information for a remainder of the session.

24. The media of claim 21, wherein if the generating is desynchronized, performing other actions, including if a known sequence of data is determined to be included after the hole in the at least one monitored flow, continuing the generating of information based on the known sequence of data.

25. The media of claim 21, wherein if the generating is desynchronized, performing other actions, including:
- performing a traffic analysis on the at least one monitored flow after detecting the hole;
- determining if a known sequence of data is included in the at least one monitored flow-based on a result of the traffic analysis; and
- if the known sequence of data is included in the at least one monitored flow, continuing the generating of information based on the known sequence of data.

26. The media of claim 21, further comprising:
- if the at least one monitored flow is determined to be encrypted, employing a block decryption key to decrypt the encrypted monitored flow;
- determining an initialization vector based on a complete block of the at least one encrypted monitored flow after detecting the hole; and
- employing the initialization vector to continue decryption of the encrypted monitored flow after detecting the complete block.

* * * * *